United States Patent [19]
Erdman et al.

[11] 3,809,891
[45] May 7, 1974

[54] BEAM SCANNING OBJECT DETECTION SYSTEM
[75] Inventors: Jurgen Erdman; Hartmut Knappe, both of Waldkirch, Germany
[73] Assignee: Erwin Sick, Waldkirch, Germany
[22] Filed: Nov. 21, 1972
[21] Appl. No.: 308,589

[30] Foreign Application Priority Data
Nov. 22, 1971  Germany............................ 2157815

[52] U.S. Cl............... 250/222 R, 250/236, 250/209
[51] Int. Cl. ............................................ G01p 3/68
[58] Field of Search .......... 250/221, 222, 236, 209, 250/217 R; 340/258 R, 258 B, 276

[56] References Cited
UNITED STATES PATENTS
3,360,654  12/1967  Muller................................ 250/221
2,955,209  10/1960  Eckweiler, Jr. et al............. 250/221
3,428,817  2/1969   Hofmeister et al........... 250/219 LG Primary Examiner—Walter Stolwein

[57] ABSTRACT

A detection system and method of operation for detecting the presence of an object in a predetermined zone. The detection system includes a pulsating light-emitting device, a lens apparatus for directing the pulses of light into a beam, and a scanning device for sweeping the pulsating beam of light across the detection zone. The detection system also includes at least two photocells, one of which is positioned to receive pulses of light directly from the light-emitting device and the other is positioned to receive light after being transmitted across the detection area. The signals developed by the photocells take the form of trains of electrical signals and are correlated with appropriate electronic circuitry for detecting the absence of pulses in one of the trains of signals during the presence of pulses in the other train of signals to thereby provide an indication of the presence of an object in the detection area. The electronic circuitry also digitally processes the received signals for developing an output indication representative of the size of the object, as well as the position of the object in the detection area.

17 Claims, 3 Drawing Figures

BEAM SCANNING OBJECT DETECTION SYSTEM

CROSS REFERENCES TO RELATED PATENTS

U.S. Letters Pat. No. 3,360,654 to H. Muller, entitled, "Light Barrier for Preventing Machine Accidents Including Fail Safe Device," issued on Dec. 26, 1967, and assigned to th assignee of the present invention.

BACKGROUND OF THE INVENTION

This invention pertains to the art of object detection devices, and more particularly, to detection devices which utilize a radiation source, such as a light source and a scanning device for sweeping a beam across a predetermined detection zone in order to detect the presence of an object within the zone.

Object detection systems are known wherein a light ray is periodically moved in rapid sequence across an area to be protected. These systems generally include an optical arrangement for directing the moving light ray, after passage across the detection area, to a photoelectric device. If the light ray is interrupted by an object positioned within the detection area, electrical signals developed by the photoelectric device are thereby causing an alarm signal to be developed. One such detection system is disclosed in the above-referenced letters patent assigned to the assignee of the present invention.

The detection system disclosed in this patent includes a rotating polygonal mirror upon which a beam of light is directed. The polygonal mirror is located at the focal point of a narrow concave mirror so that the beam of light, deflected periodically during rotation of the polygonal mirror, is moved in parallel relationship with respect to itself and will periodically sweep across a detection zone. Between the light source and the polygonal mirror there is an inclined partially transmitting mirror which directs the returning beam of light to a photoelectric device.

With the detection system disclosed in the referenced patent, the traveling beam is broken or chopped by the polygonal mirror. This chopping operation is caused by the fact that the polygonal mirror has alternate blackened and reflective surfaces. Thus, as the mirror is rotated, a pulsed light beam is generated. With the pulse-type beam, it is possible to detect both luminous and non-luminous objects in the scanning zone because both of these obstacles result in a change in the sequence of pulses. By evaluating the light pulses arriving at the photoelectric device a determination may be made as to the presence or absence of an object in the detection zone.

These detection systems have been satisfactory to a large extent, however, because of the practical limitations to the optical production of a fine traveling light beam, there is a limit to the resolution of these systems. In other words, these detection systems are unable to detect a very small object positioned in the detection zone.

SUMMARY OF THE INVENTION

The present invention is directed toward apparatus for generating a light curtain having almost any degree of light-dark provisions in the traveling beam.

It has been found that the resolution of a light curtain detection system may be substantially improved by generating pulses of light before the light is transmitted into the scanning apparatus. Thus, by pulsating a light source before the deflection of the light to form a traveling beam, a much finer screen of light-dark divisions of the traveling beam is possible. Accordingly, the position of obstacles may be determined with a much higher degree of accuracy. It is also possible to detect obstacles having a thickness even less than the width of a single light bundle.

In one aspect of the present invention, there is the provision of a pulsating source of radiation, such as a pulsating light-emitting device, focusing means, such as a lens arrangement, for directing the pulses of light into a beam, and scanning means, such as a rotating polygonal mirror, for sweeping the pulsating light beam across a detection zone. A first photoelectric device is positioned to receive pulses of light directly from the light-emitting device, and a second photoelectric device is positioned to receive the pulses of light after being transmitted across the detection zone. The signals which are developed by the photoelectric devices take the form of trains of electrical signals. These signals are correlated by appropriate electronic circuitry for determining the absence of pulses in one of the trains of signals during the presence of pulses in the other train of signals to thereby provide an output signal indicative of the presence of an object in the detection zone.

In another aspect of the present invention, the detection system includes a light-emitting diode and a pulse generator for periodically energizing the light-emitting diode in order to generate pulses of light at a very high repetition rate.

In another aspect of the present invention, the signal processing circuitry includes gating circuitry and digital counting circuitry for providing an indication of the size of the object and the position of the object within the detection zone, in addition to an indication of the presence of the object.

In another aspect of the present invention, there is the provision of a third photoelectric device which is positioned at the edge of the scanning zone of the traveling beam of light for detecting the beginning or end of a scanning period in order to reset the signal processing circuitry for determining the position of the object in the detection zone.

These and other objects and advantages of the invention will become apparent from the following description of the preferred embodiment of the invention as read in conjunction with the accompanying drawings and in which:

DESCRIPTION OF A PREFERRED EMBODIMENT

Figure 1:
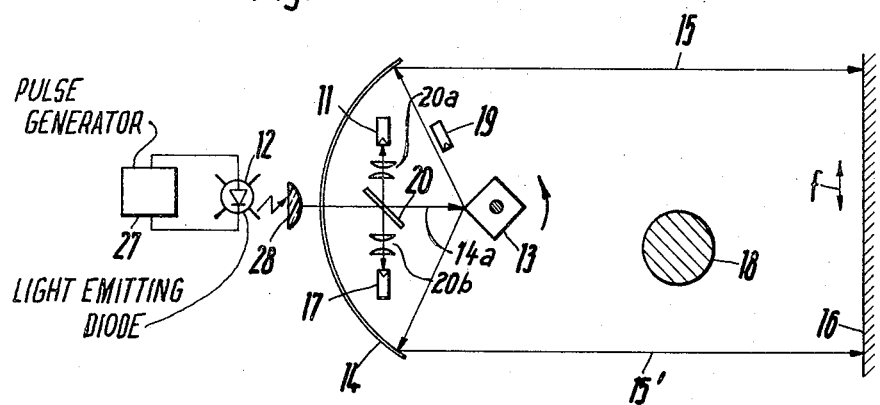
FIG. 1 is a diagrammatic illustration in basic form of the detection system of the present invention.

FIG. 1 illustrates in diagrammatic form a beam scanning object detection system which is generally comprised of a four-sided mirror wheel 13 mounted for rotation at the focal point of a parabolic mirror 14. With a beam of light directed toward the mirror wheel 13 along a path 14a, a traveling beam 15, 15' is swept periodically across a reflector 16 in the direction as indicated by the double arrow f. The beam which strikes the reflector 16 is reflected back onto itself.

The mirror wheel 13 preferably takes the form of a four-sided mirror. To prevent the interruption of the light beam during the transition between one side of the mirror and the next side as the mirror rotates, transition mirrors (not shown) are disposed between adjacent sides of the mirror wheel.

A light source which preferably takes the form of a semiconductor device, such as a light-emitting gallium arsenide diode 12, is pulsed at a high frequency rate by a pulse generator 27. The pulsating light emitted by the diode 12 is focused into a narrow beam of light through a suitable lens 28 and is directed along the path 14a in a direction toward the mirror wheel 13. The source of pulsating light may take the form of a continuous light source in conjunction with a perforated window or Kerr Cell.

A partially reflective, double-sided mirror 20 is disposed in the path 14a between the lens 28 and the mirror wheel 13. This partially reflective mirror is inclined at an angle of approximately 45° with respect to the path 14a. Thus, light which is reflected back onto itself by the reflector 16 is directed back toward the mirror wheel 13 by the parabolic mirror 14. Upon striking the mirror wheel 13, the returning beam of light is then reflected by the mirror 20 through a lens arrangement 20a to a photocell 11.

The partially reflective mirror 20 also serves to deflect a portion of the pulses of light emitted by the diode 12 through a lens arrangement 20b to a second photocell 17. Pulses of light emitted by the diode 12 are also passed through the mirror 20 along the path 14a and strike the mirror wheel 13. Thus, by the autocollimator principle, the single beam of pulsating light leaving the lens 28 is collimated into a traveling pulsating beam of light which sweeps the detection zone.

The traveling pulsating beam 16 scans across the space through which it travels for detecting and locating objects in the detection zone. For example, if the beam 15 is interrupted by an object 18, the photocell 17 continues to receive pulses of light from the diode 12, however, with the traveling beam interrupted, there are no pulses of light returned to the photocell 11.

A third photocell 19 is positioned at the edge of the scanning zone between the mirror wheel 13 and the parabolic mirror 14. The beam of light deflected from the mirror wheel 13 to the parabolic mirror 14 strikes the photocell 19 only at the completion of a scanning cycle. Signals from the photocell 19 are utilized to reset circuitry within the signal processing circuit so that the position of the object 18 with respect to the detection zone may be electronically computed.

Figure 2:
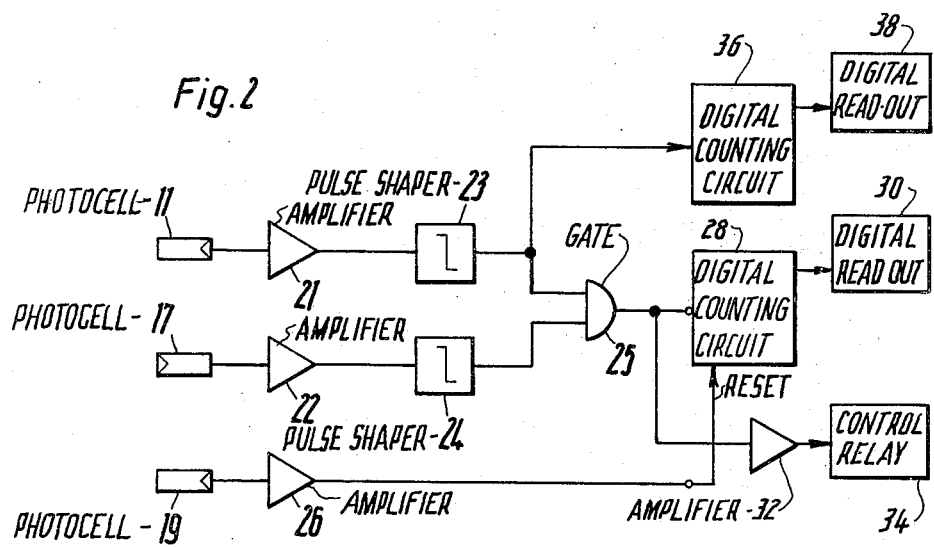
FIG. 2 is an electrical block diagram illustrating the signal processing circuitry of the detection system shown in FIG. 1; and, FIG. 3 is a graphical representation of typical electrical signals developed by the signal processing circuitry as shown in FIG. 2.

Reference is now made to FIG. 2 which illustrates the signal processing circuitry for the object detection system shown in FIG. 1. The photocells 11, 17, 19 correspond to the similarly numbered photocells in FIG. 1. The output terminals of the photocells 11, 17, 19 are each connected to the input terminal of one of three amplifiers 21, 22, 26. The amplifier 22 serves to amplify and phase shift by 180 degrees the input signal applied to this amplifier. The other amplifiers 22, 26 merely amplify the signals applied to the input terminals.

The output terminals of the amplifiers 21, 22 are each connected to the input terminal of one of a pair of pulse shaper circuits 23, 24 and the output terminal of the pulse shaper circuits 23, 24 are connected to an AND gate 25. As illustrated, the output terminal of the AND gate 25 is connected to a first digital counting circuit 28 having a digital read-out meter 30. The digital counting circuit 28 is reset by applying the signal developed by the amplifier 26 to the reset terminal of the counting circuit. As will be described in more detail, the digital read-out meter 30 provides an output indication of the size of the object within the detection zone.

The output terminal of the AND gate 25 is also applied through an amplifier 32 to a control relay 34 for developing an alarm signal in response to the presence of an object within the detection zone.

The output terminal of the pulse shaper circuit 23 is also connected to a second digital counting circuit 36 having a digital read-out meter 38. As will be described, the read-out meter 38 provides an output indication of the position of the object within the detection zone.

Figure 3:
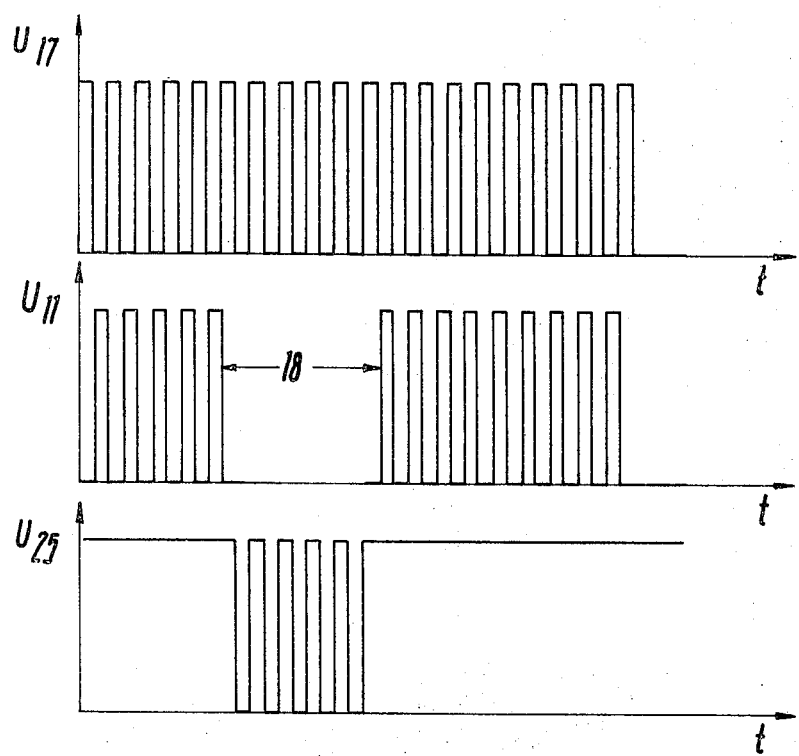

Reference is now made to FIG. 3 which generally illustrates the voltage waveforms developed by the pulse shapers 23, 24, and the AND gate 25. More particularly the signals developed by the photocell 17, which generally take the form of a train of rectangular pulse signals, are amplified and shaped by the pulse shaper 24 to provide a wave pattern $U_{17}$ as illustrated. With reference to the train of signals $U_{11}$ developed by the photocell 11 and its associated amplifier 21 and pulse shaper circuit 23, it is apparent that the pulses developed by the photocell 11 are interrupted during that portion of the sweep of the pulsating beam of light at which the object 18 appears. Thus, the number of pulses which occur prior to the absence of the first pulse, in the example of FIG. 3 there are five such pulses, is a measure of the distance between the edge of the scanning zone and one edge of the object. Similarly, the number of pulses occuring after the beam has passed the object, i.e., nine pulses in the example of FIG. 3, is a measure of the distance from the other edge of the object and the other edge of the scanning zone.

As previously discussed, and as may be noted in FIG. 3, the pulses developed by the photocell 11 and its associated amplifier 21 and pulse shaper circuit 23 are shifted by 180 degrees. Accordingly, with the signals developed by the pulse shaper circuit 23 and the pulse shaper circuit 24 applied to the AND gate 25, pulse signals are developed by the gate 25 only during the presence of pulse signals from the pulse shaper circuit 24 in the absence of signals from the pulse shaper circuit 23. The pulse signals developed by the AND gate 25 are applied to the digital counting circuit 28. Thus, the output presentation developed by the digital read-out device 30 is a measure of the size of thee object 18. By a proper setting of the switching threshold of the pulse shaper circuit 23, the detection system can be made so sensitive that even with a partial darkening of the traveling beam 15 by an object 18 producing a slight decrease in the amplitude of the pulse $U_{11}$, the pulse $U_{11}$ falls below the switching threshold of the pulse shaper circuit 23 to thereby cause an output signal to appear on the AND gate 25.

The signals developed by the pulse shaper 23 which take the form of the waveform $U_{11}$ in FIG. 3 are applied to the digital counting circuit 36. Thus, the digital counting circuit 36 may be gated to either count the pulses which occur before the beam strikes the object in order to measure the distance between one edge of the scanning zone and an edge of the object, or the digital counting circuit 36 may be gated to count the pulses which occur between the other edge of the object and the edge of the detection zone. With either of these measurements it is possible to locate the position of the object within the detection zone.

The output signals developed by the AND gate 25 which take the form of the waveform $U_{25}$ in FIG. 3 are applied through the amplifier 32 to the control relay 34. Thus, the control relay 34 is actuated in response to a change in the value of the waveform $U_{25}$ to thereby actuate an alarm device. Accordingly, if an object is moved into the detection zone, the control relay 34 is energized to actuate an alarm device.

The disclosed object detection system provides an alarm system for detecting the presence of an object, a digital measuring arrangement for measuring the size of an object within the detection zone, or the position of the object with respect to the detection zone.

The digital measuring circuitry may be made responsive to an object having very small dimensions, even dimensions smaller than the width of a single light bundle, by properly setting the threshold level of the pulse shaper circuit 23.

The invention has provided a novel object detection system in which a pulsating beam of light is collimated into very thin bundles of pulsating light beams. These thin bundles of precise pulsating light bundles provide a substantial improvement in the resolution of the detection system.

Many variations and modifications of the invention will become apparent to those skilled in the art. Therefore, it is to be understood that within the scope of the appended claims, the invention may be practiced otherwise than as specifically shown and described.

Having thus described our invention, we claim:

1. An apparatus for detecting the presence of an object in a detection zone and including pulsating light-emitting means for generating abrupt pulses of light, means for directing said pulses of light into a beam of pulsating light, beam scanning means positioned to receive said beam of pulsating light for sweeping the pulsating light beam across the detection zone once during each of at least one scanning cycle, the duration of said scanning cycle being sufficient to allow the occurrence of a plurality of pulsations of said pulsating beam during said sweeping of said beam once across said detection zone, to divide the scanned detection zone into a plurality of digital increments, first light responsive means positioned to receive without interruption the pulses of light generated by said light-emitting means for developing a first train of electrical signals in response to the receipt of said pulses of light, second light responsive means positioned to receive those pulses of light of the pulsating beam which pass uninterrupted across the detection zone for developing a second train of electrical signals in response to the receipt of those pulses of light passing uninterrupted across said zone, and circuit means coupled to both said first and said second light responsive means for developing an indicator signal upon the receipt of pulses in said first train of electrical signals in the absence of pulses in said second train of electrical signals to thereby provide an indication of the presence of an object in the detection zone.

2. An apparatus as defined in claim 1 including means for deflecting at least a portion of the light energy in said beam of pulsating light in a direction away from said scanning means and in a direction toward said first light responsive means.

3. An apparatus as defined in claim 2 wherein said deflecting means includes a partially reflective mirror disposed in a beam path extending between said light-emitting means and said beam scanning means.

4. An apparatus as defined in claim 1 including a third light responsive means positioned to receive pulses of light only when said beam scanning has completed a sweep of the pulsating light beam across the detection zone.

5. An apparatus as defined in claim 4 wherein said third light responsive means is positioned to receive pulses of light after being deflected by said beam scanning means and positioned to receive pulses of light only when said pulsating light beam has been swept to an edge of the detection zone.

6. An apparatus as defined in claim 5 wherein said pulsating light-emitting means includes a light-emitting diode and pulse generator means for periodically energizing said diode at a high repetition rate.

7. An apparatus as defined in claim 6 wherein said light-emitting diode takes the form of a gallium arsenide diode.

8. An apparatus as defined in claim 1 wherein the beam scanning means includes a parabolic mirror, rotatable reflective means substantially positioned at the focal point of said parabolic mirror for sweeping a beam of light across said parabolic mirror, and reflection means positioned beyond the focal point of said parabolic mirror and disposed to reflect the beam of pulsating light back onto itself.

9. An apparatus for detecting the presence of an object in a detection zone and including pulsating radiation-emitting means for generating abrupt pulses of radiation, means for directing said pulses of radiation into a beam of pulsating radiation, scanning means positioned to receive said beam of pulsating radiation for sweeping the pulsating beam across the detection zone once during each of at least one scanning cycle, the duration of said scanning cycle being sufficient to allow the occurrence of a plurality of pulsations of said pulsating beam during said sweeping of said beam once across said detection zone, to divide the scanned detection zone into a plurality of digital increments, first radiation responsive means positioned to receive without interruption the pulses of radiation generated by said radiation-emitting means for developing a first train of electrical signals in response to the receipt of said pulses of light, second radiation responsive means positioned to receive those pulses of radiation of the pulsating beam which pass uninterrupted across the detection zone for developing a second train of electrical signals in response to the receipt of those pulses of radiation passing uninterrupted across said zone, and circuit means coupled to both said first and said second radiation responsive means for developing an indicator signal upon the receipt of pulses in said first train of electrical signals in the absence of pulses in said second train of electrical signals to thereby provide an indication of the presence of an object interrupting the passage of said radiation pulses across the detection zone.

10. An apparatus as defined in claim 9 including means for deflecting at least a portion of the radiation energy in said beam of pulsating radiation in a direction away from said scanning means and in a direction toward said first radiation responsive means.

11. An apparatus as defined in claim 10 including a third radiation responsive means positioned to receive pulses of radiation only when said beam scanning has completed a sweep of the pulsating radiation beam across the detection zone.

12. An apparatus for producing a light curtain and including pulsating light-emitting means for generating abrupt pulses of light, lens means for directing said pulses of light into a beam of pulsating light, divider means for directing a portion of the energy in said beam of light along a first path and a portion of the energy in said beam of light along a second path, beam scanning means positioned along said first beam path for sweeping said pulsating light beam across a detection zone once during each of at least one scanning cycle, the duration of said scanning cycle being sufficient to allow the occurrence of a plurality of pulsations of said pulsating beam during said sweeping of said beam once across said detection zone to divide the scanned detection zone into a plurality of digital increments, first light responsive means positioned along the second path to receive uninterrupted the pulses of light generated by said light-emitting means for developing a first train of electrical signals in response to the receipt of all of said pulses of light, second light responsive means positioned to receive those pulses of light passing uninterrupted across said zone for developing a second train of electrical signals in response to the receipt of said uninterrupted pulses of light, and circuit means coupled to both said first and said second light responsive means for developing an output signal upon the receipt of pulses in said first train of electrical signals in the absence of pulses in said second train of electrical signals to indicate the presence of an object in the detection zone interrupting the passage of some of the light pulses along said first path across the detection zone.

13. An apparatus as defined in claim 12 wherein said circuit means includes phase shifting circuit means for shifting one of said trains of electrical signals by 180°, and gating means coupled to one of said light responsive means and to said phase shifting circuit means for developing a said output upon the receipt of pulses from only said one light responsive means or said phase shifting circuit means.

14. An apparatus as defined in claim 13 including means for deflecting at least a portion of the light energy in said beam of pulsating light in a direction away from said scanning means and in a direction toward said first light responsive means.

15. An apparatus as defined in claim 14 wherein said deflecting means includes a partially reflective mirror disposed in a beam path extending between said light-emitting means and said beam scanning means.

16. An apparatus as defined in claim 13 including a third light responsive means positioned to receive pulses of light only when said beam scanning has completed a sweep of the pulsating light beam across the detection zone.

17. An apparatus as defined in claim 16 wherein said third light responsive means is positioned to receive pulses of light after being deflected by said beam scanning means and positioned to receive pulses of light only when said pulsating light beam has been swept to an edge of the detection zone.

* * * * *